United States Patent [19]

Blaney

[11] 4,360,871
[45] Nov. 23, 1982

[54] METHOD FOR FABRICATING WIND TURBINE BLADES

[75] Inventor: David H. Blaney, Tolland, Conn.

[73] Assignee: United Technologies Corporation, Hartford, Conn.

[21] Appl. No.: 191,036

[22] Filed: Sep. 25, 1980

Related U.S. Application Data

[63] Continuation of Ser. No. 972,567, Dec. 22, 1978, abandoned.

[51] Int. Cl.$^3$ .............................................. G06F 15/20
[52] U.S. Cl. .................................... 364/300; 364/468; 29/156.8 B
[58] Field of Search ............... 364/300, 425, 468, 469, 364/472, 474, 475; 29/156.8 T, 156.8 B, 156.8 H, 156.8 P; 242/7.21, DIG. 1; 244/123-133

[56] References Cited

U.S. PATENT DOCUMENTS

| | | | |
|---|---|---|---|
| T915,006 | 10/1973 | Friedman | 364/300 |
| 3,224,690 | 12/1965 | Holman | 242/3 |
| 3,234,362 | 2/1966 | Holman | 242/3 X |
| 3,653,110 | 4/1972 | King et al. | 29/156.8 B X |
| 3,771,168 | 11/1973 | Beach et al. | 364/300 |
| 3,875,389 | 4/1975 | McFadden et al. | 364/472 X |
| 3,882,304 | 5/1975 | Walters | 364/300 X |
| 4,079,235 | 3/1978 | Froyd et al. | 364/474 X |
| 4,145,740 | 3/1979 | McCean et al. | 242/DIG. 1 X |
| 4,251,036 | 2/1981 | McLain | 242/7.21 |

Primary Examiner—Edward J. Wise
Attorney, Agent, or Firm—D. F. Bradley

[57] ABSTRACT

The manufacture of large scale wind turbine blades is accomplished by winding composite fiber materials onto a mandrel to form the desired airfoil shape. The winding process requires that the fibers always maintain contact with the mandrel surface. If the surface is concave the fibers will form a bridge over the concave surface portion which produces a void. This invention avoids bridging by analysis of the mandrel surface design including the steps of defining a plurality of coordinate points on the surface prior to winding thereof, and determining if a concavity will occur in the fiber winding plane passing through each coordinate point. If a concavity is located, the mandrel design coordinate point at the concavity is modified to eliminate the concavity and provide a continuous flat or convex surface in the fiber winding plane. The process can be automated by clerical or computing methods, and is repeated for each coordinate point until bridging is substantially eliminated.

8 Claims, 5 Drawing Figures

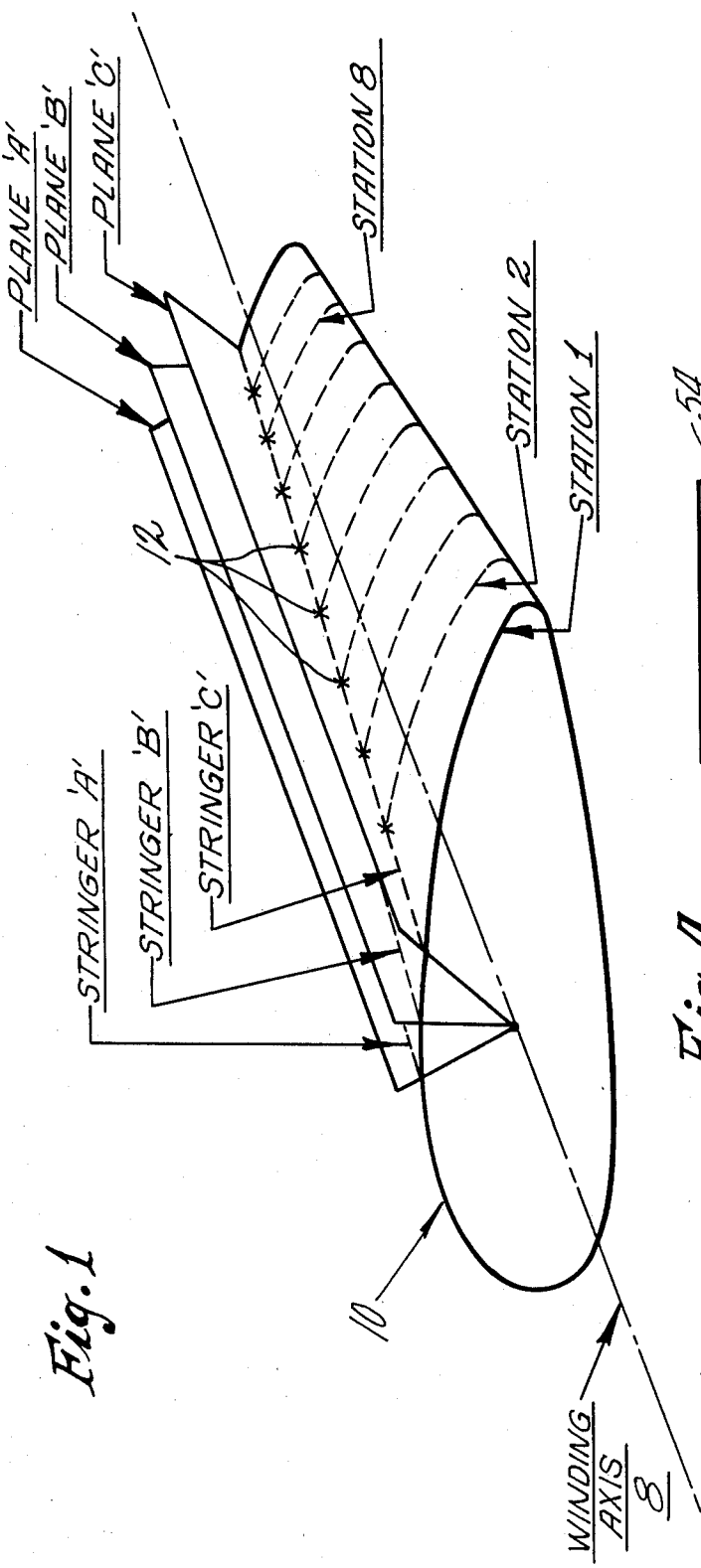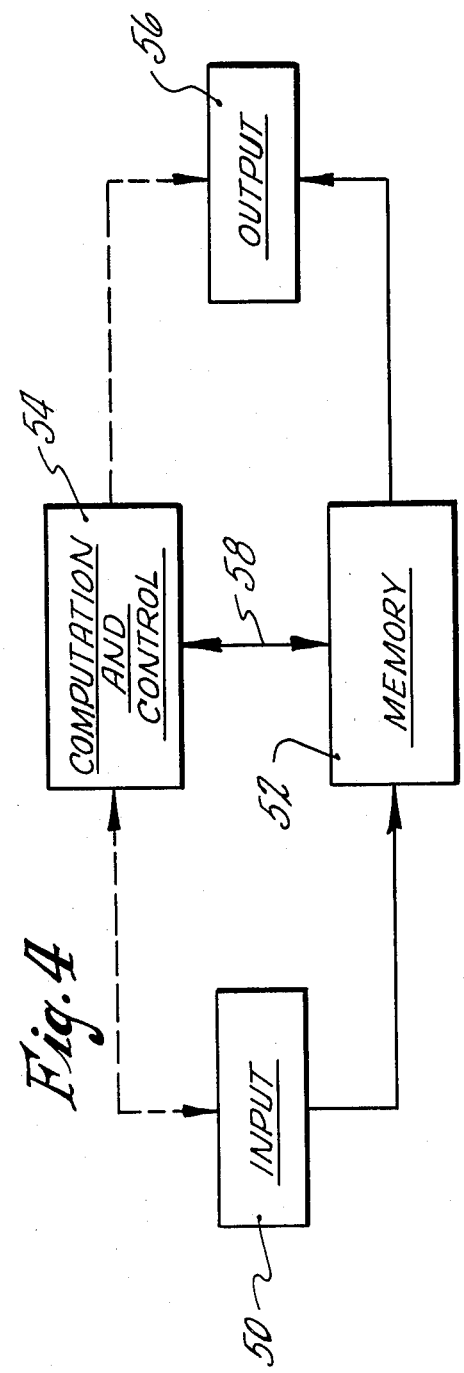

METHOD FOR FABRICATING WIND TURBINE BLADES

This is a continuation of application Ser. No. 972,567 filed on Dec. 22, 1978, abandoned.

BACKGROUND OF THE INVENTION

1. Field of the Invention

This invention relates to the design and fabrication of airfoil shapes, and particularly to composite fiber wound large scale wind turbine rotor blades. More particularly, the invention provides a method for avoiding the problem of bridging which occurs when the composite fiber is wound over a concave mandrel surface to form the airfoil shape. The fibers, being under tension during the winding process, will not follow a concave contour or valley of the surface, but will form a bridge, resulting in the occurrence of voids in the surface which weaken the blade structure.

2. Description of the Prior Art

Techniques for fabrication of airfoils such as propeller and rotor blades are well known in the art, and include the use of wood, wood laminates, various metals, and more recently composite materials such as fiberglass. Very large rotor blades, such as those used in wind driven turbine generators, present unique problems due to their very large size, up to 300 feet in combined length. A preferred cost and weight saving technique for fabricating these blades is by a process that involves winding fibers onto a mandrel. A band or group of parallel resin-impregnated filaments is wound onto a slowly rotating mandrel. The band typically is about 2 inches wide, and composed of a plurality of rovings, each from a separate spool. Each roving consists of a large number of filaments, so that the band contains many thousands of separate glass filaments. The payout guide is positioned during mandrel rotation to produce the desired band path on the mandrel. Bridging, or winding over a concave area of the mandrel, does not occur on cylindrical shapes, but can be expected on a wind turbine blade because of blade twist and its root-to-tip thickness characteristic. With a filament winding angle of 30 to 40 degrees, the concave shape also appears along the desired band path. If a section is cut along the band path, the section is bridged if there is a void between the mandrel and the fiber or filament pulled tightly across it.

The most visible problem caused by bridging is voids, which weaken the structure. The voids may be filled with glass and resin to make a solid structure, but this adds substantial weight at considerable extra cost. Bridging can produce poor fiber compaction, thus increasing the resin-to-glass ratio and lowering its strength. Loss of fiber control means that an unsupported band will tend to form a rope, or to separate.

The angle of winding of the fibers is determined as required by the specific shape and loads on the blade, and the angle may be varied along the longitudinal axis of the blade. Further, conventional winding techniques normally involve multiple winding passes whereby layers of fibers are built up to form the airfoil. In some applications specific portions of the airfoil or blade may contain more layers of fibers than others, e.g., in rotor blades it is common to apply many more layers of fiber to the inboard or hub end than to the outboard end to enhance structural rigidity and to absorb loads.

In many applications a so-called winding or adapter ring is used at the end of the blades, the fibers being wrapped about the ring during fabrication and the fibers being cut off at the end of the blade after fabrication. Again this technique is well known.

In some applications the fibers in different passes may be of different compositions, and different passes may use fibers of varying thicknesses, or different spacings, or different angles. A common technique is to perform one winding pass on a right-hand helical path, with the next pass being on a left-hand helical path.

For large blades a solid surface is generally used as the mandrel over which the fibers are wound. The mandrel may be, for example, a plywood frame covered with wire cloth and a plaster filler, or it may be aluminum or plastic. In some applications a spar section is located inside the rotor or airfoil for added strength, with mandrel sections located adjacent the spar. Upon fabrication, the mandrel may be removed from the inside of the airfoil, or it may be left in place to act as a structural reinforcement.

Although the invention will be described with respect to glass fibers coated with resin or other epoxy matrix, it is apparent that other types of fibers and/or matrices are equally applicable, and that single or multiple fibers may be used in practicing the invention.

Bridging may be prevented in some cases by varying the winding angle, but this is not always practical since changing the winding angle changes the strength and load absorbing characteristics of the rotor. Another solution is to modify the mandrel design, and yet another solution is to determine in advance from the design geometry the localized areas of the mandrel where bridging will occur, and adjust the shape of the design geometry and the mandrel to avoid bridging. In other words, fixing an airfoil to avoid bridging means slightly changing the mandrel shape so it is not concave along any band path. Airfoil changes resulting from bridge-fixing are primarily near the trailing edge of root stations, resulting in a negligible impact on aerodynamic performance.

It is therefore an object of this invention to provide a method which avoids or reduces bridging in the fabrication of large scale fiber wound rotor blades.

Another object of this invention is a method for determining where bridging will occur when a composite fiber is wound over a mandrel or other contoured structure.

A further object of this invention is a method for making minor changes in the shape of the mandrel or structure upon which a fiber composite is wound to avoid bridging.

SUMMARY OF THE INVENTION

In accordance with the present invention, there is provided a method for determining where bridging will occur in the manufacture of an airfoil surface by the winding of a composite fiber material upon a mandrel, and for modifying the contour of the mandrel airfoil surface to eliminate bridging. The method consists of providing the mandrel airfoil surface or defining the surface from design data in any selected coordinate system, such as cylindrical coordinates, and selecting representative coordinate points on the airfoil at fixed intervals. As an illustrative example, a set of lines denoted stringers coordinate points is defined by the intersection of a plurality of longitudinal planes, each of which is in a plane containing the winding axis, with the mandrel surface. A plurality of planes, which are normal to the winding axis intersect the mandrel surface along a plurality of lines denoted sections or stations which are transverse to the stringers. The intersection of the stringers and stations define a grid of coordinate points on the mandrel surface. At each coordinate point, two straight lines are constructed coincident with the fiber winding plane, the first straight line beginning from the selected coordinate point and extending in the direction of fiber winding and coincident with the fiber winding plane, and the second straight line beginning from the selected coordinate point and extending coincident with the fiber winding plane but opposite the direction of fiber winding, i.e., 180° from the direction of the first straight line. Both straight lines are extended until they intersect either the next adjacent stringer, or next adjacent station; either may be selected. The two straight lines thereby connect the selected coordinate point with the points of intersection with the adjacent stringers, or stations. A third straight line is outer constructed connecting the two outer points of intersection of the first and second straight lines with the adjacent stringers or stations with respect to their distance from the winding axis, i.e., the points of intersection of the winding plane with the stringers, or stations, adjacent the selected coordinate point. The selected coordinate point is bridged if it lies closer to the winding axis than does the third straight line. The third line is constructed on a plot in the winding plane. The coordinate point, if bridged, must be raised to the level of the third straight line to avoid bridging. This method is then repeated for each coordinate point except boundary points at the axial ends of the airfoil. The method may be performed by hand using standard clerical techniques, or preferably is automated by standard computer techniques. The stringers and/or stations need not be parallel to or normal to the winding axis. The method is adapted to any coordinate system defining the airfoil shape, or any valid geometric description of the airfoil surface and winding band path.

BRIEF DESCRIPTION OF THE DRAWINGS

FIG. 1 is perspective view of a representative airfoil showing the winding axis, stringers and stations.

FIG. 4 is a schematic drawing of a computer adapted to perform the method of this invention.

DESCRIPTION OF THE PREFERRED EMBODIMENT

When an airfoil is designed for a particular purpose, such as a rotor blade to power a wind turbine, certain constrains are inherent in the design, e.g., contour, length, aerodynamic performance, weight, load distribution, etc. Although fabrication of the blade is also taken into account in the design, many parameters of the design cannot be changed even though the particular design causes difficulties in fabrication of the blade.

With large scale wind turbine blades, conventional fabrication techniques are costly and difficult, and it has been determined that a fiber wound blade is optimal. Winding, however, has presented unexpected difficulties due to the bridging problem described previously. The present invention overcomes these difficulties without the necessity of completely redesigning the blade. That portion of the method wherein concavities in the mandrel surface are determined, is readily adapted to manual techniques, i.e., can be performed by hand using standard geometric procedures, but because of its iterative nature is best adapted to computing apparatus. The method will be described with respect to the steps involved in manually accomplishing the result, but a computer can perform the same steps faster and more efficiently.

Referring to FIG. 1 there is shown in perspective a portion of a typical airfoil, shaped mandrel 10 such as for a rotor blade. While a specific sweep or contour is not shown, it may be assumed that the cross section of the blade 10 varies in sweep and dimension along its axial length, the hub end generally being thicker than the outboard tip. The method of this invention is applicable to any conventional aerodynamic airfoil shape, and in fact need not be restricted to airfoils, but can be used for any contoured surface.

Once the blade is designed, in order to wind fibers or filaments into the desired aerodynamic shape, it is necessary to construct a mandrel upon which to wind the fibers. It has been found that constructing the mandrel according to the design normally results in difficulties in rotor blade fabrication due to the bridging problem, and an unsatisfactory blade results. Of course it is possible to manually inspect the mandrel after its fabrication, such as using a straight edge along the paths over which a fiber will be wound, and correct any concave portions, but this solution is obviously extremely time-consuming, and any correction to the mandrel will require another inspection to determine if correction of one concave portion has produced another concave portion when the fiber is wound in a return path.

The method of this invention uses standard geometric techniques to determine from the design data, if any concave portions exist in the fiber winding paths, and the shape of the mandrel can be corrected to avoid bridging.

Figure 2:
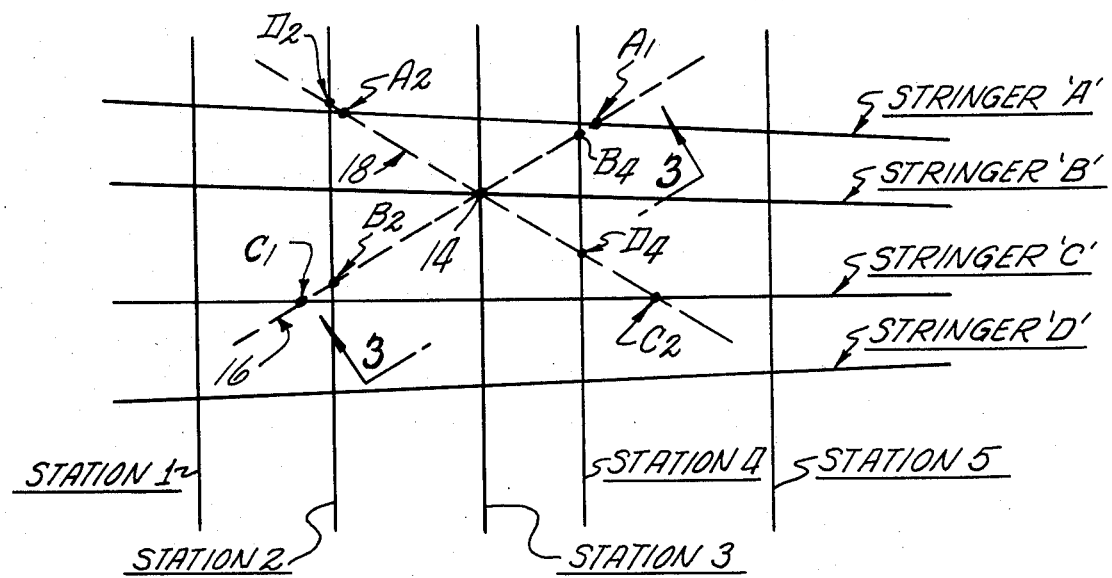
FIG. 2 is a diagrammatic plan view of the upper surface of the airfoil of FIG. 1 showing the intersection of the stringers and stations.

The blade design is often defined in cylindrical coordinates, although the coordinate system is irrelevant since it requires only simple mathematics to convert from one coordinate system to another. Assuming a cylindrical coordinate system, a plurality of stringers are geometrically constructed, via manual or computer techniques, preferably but not necessarily in a plane which also contains the winding axis of the blade. Three such representative stringers are shown in FIG. 1 as stringers A, B and C, and the stringers are in planes through the winding axis, although it will be apparent that the actual geometric shape and number of stringers is variable. The stringers extend entirely about the perimeter of the airfoil. The stringers may be at fixed intervals, such as every 5°, or may vary such as every 10° along relatively straight cross sections of the blade and every ½° along the leading and trailing edges where greater airfoil curvature occurs. Although each stringer is preferably, but not necessarily, in a plane which contains the winding axis of the blade, the stringers at their point of intersection with the airfoil are not parallel to each other, as shown in FIG. 2, and may in fact be curved lines depending on the airfoil curvature. For example, a stringer along the airfoil leading edge will curve in two dimensions as the airfoil becomes narrower at its tip and is swept along its length.

Likewise a plurality of sections or stations are shown in FIG. 1 denoted stations 1, 2 . . . 9. Each station lies in a plane which is commonly, but not necessarily, normal to the winding axis 8. The number of stations will depend on the length and curvature of the blade, a representative distance being about 5% of blade length.

Coordinate points 12 (FIG. 1) are defined at the intersection of every stringer with every station.

The airfoil shown in FIG. 1 may include a winding ring, also referred to as an adapter or turnaround ring. For example, the actual blade may end at station 3, with stations 2 and 1 being part of a winding ring. It is generally necessary in practicing the invention to include the winding ring to insure a bridge-free design of both the airfoil and the blend area between the winding ring and the airfoil.

The following method, performed by clerical or computing techniques, is repeated for every coordinate point on the airfoil matrix except the boundary points.

With reference to FIG. 2, coordinate point 14 located at the intersection of stringer B and station 3 has been selected. It should also be noted that FIG. 2 is a two-dimensional top view of a selected portion of the airfoil, and that in fact the airfoil will vary in cross section, i.e., each point in FIG. 2 will vary in height or depth, viz., into or out of the plane of the paper, as a function of the airfoil design.

Through the selected coordinate point 14 two planes, 16 and 18, referred to as winding planes, are constructed at angles corresponding to the angles at which the fiber is to be wound. Using plane 16 as illustrative, two straight lines, shown in FIG. 3 as lines 15 and 17, are constructed coincident with winding plane 16, the first straight line 15 beginning at coordinate point 14 and extending until it intersects either station 4 or stringer A, at point A, shown in FIG. 2 and the second straight line 17 beginning at coordinate point 14 and extending in plane 16 in a direction generally opposite that of line 15 until it intersects either station 2 at point $B_2$ or stringer C, at point $C_1$. It will be understood that it is a matter of choice whether stringers or stations to the selected coordinate point are used. The lines 15 and 17 while both in winding plane 16 as defined herein, are not generally collinear since the airfoil is a three-dimensional surface. It should also be noted that geometric models other than planes may be used to define the winding path, and that this invention encompasses any geometric model.

With respect to winding plane 18, two additional straight lines are drawn in opposite directions from coordinate point 14 in the winding plane to the point of intersection with the adjacent stringers, or stations, these points being shown in FIG. 2 as points $A_2$ or $D_2$ for one line, and points $C_2$ or $D_4$ for the other line. Again, since all points are in the same plane, the points used are a matter of choice. For the example described herein, intersection with stringers will be used as the points of intersection.

Figure 3:
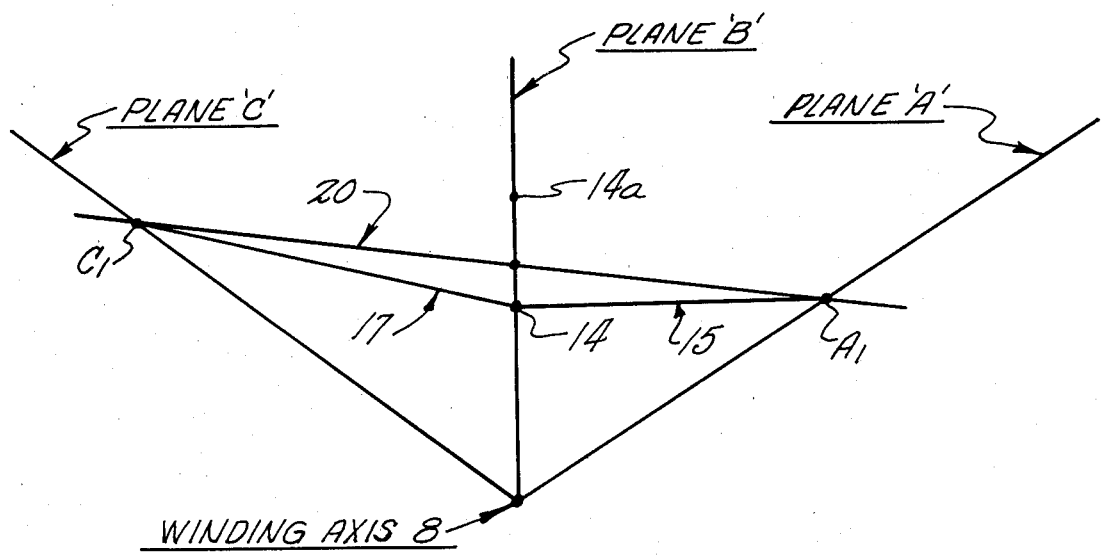
FIG. 3 is a diagrammatic view taken along section 3—3 of FIG. 2.

The distance of the intersected points from the winding axis is then determined. This distance is known for the coordinate points. Assuming that the lines between adjacent coordinate points are straight lines, a third straight line 20 shown in FIG. 3 is defined as extending between points $A_1$ and $C_1$, the relative location of the third straight line 20 to the coordinate point 14 determining if coordinate point 14 is bridged. Thus, if the coordinate point is located as shown at 14, the coordinate point is closer to the winding axis than in line 20 between points $A_1$ and $C_1$, and point 14 would therefore be bridged. If the coordinate point is located as shown at therefore 14a, the coordinate point is located further away from the winding axis than the line between points $A_1$ and $C_1$, and would not be bridged. Any coordinate point along or above line 20 is not bridged, while any coordinate point below line 20 is bridged.

If a coordinate point is bridged, that portion of the mandrel surface corresponding to the point must be raised up to the level of line 20 to avoid bridging.

Points $B_2$ or $B_4$ could be used in FIG. 3 rather than $A_1$ or $C_1$, since all points are on the same line and in the winding plane.

The above procedure may be then repeated using points $A_2$ or $D_2$, and points $C_2$ and $D_4$, in winding plane 18 corresponding to the other defined winding direction.

The above method may then be repeated for every non-boundary coordinate point on the airfoil matrix. This completes one iteration of the method.

If the winding path is defined as other than a plane, line 20 may not intersect a line extending from the winding axis, and perpendicular thereto, through the selected coordinate point. For the method of this invention this is immaterial, since the relevant data is the difference, if any, between the distance of the line 20 from the winding axis and the distance of the coordinate point from the winding axis.

As an alternative to examining each selected coordinate point for possible bridging along both winding planes 16 and 18 and then proceeding to examine the next coordinate point in the same manner, it may be desirable in some applications to first examine every coordinate point for bridging in sequence along one winding path, e.g., the right-hand helical winding path, and then reexamine the same coordinate points for bridging in sequence along the other winding path, e.g., the left-hand helical winding path. An advantage of examining each coordinate point in both winding paths before proceeding to the next coordinate point is that under certain conditions a bridged coordinate point need not be changed. For example, if relatively minor bridging occurs in the winding path of the first or lowest fiber, such bridging can be ignored in some cases if the winding path of the next succeeding fiber, in the opposite direction, does not bridge the coordinate point since the lower fiber will be physically forced down by the next succeeding fiber to contact the mandrel, thereby eliminating the bridging problem for that coordinate point.

If any coordinate points were raised to eliminate bridging, it may be necessary to perform an additional iteration of the method to determine if raising of one coordinate point has caused bridging of another coordinate point.

The number of stringers and stations, and thus the number of coordinate points, is a design choice, and will depend on the blade curvature, i.e., for a blade with large pitch changes and/or sweep, it may be desirable to use more coordinate points than with a more straightforward airfoil shape.

The method has been described with respect to cylindrical coordinates, but is equally applicable to other coordinate systems by simple geometric and/or mathematical transformation of the airfoil design data. Also, in practice, stringers and stations need not be planar nor be coincident with or perpendicular to the winding axis. After elimination of bridged points, the final coordinates define the appropriate mandrel, or templates therefor, for winding of the airfoil.

FIG. 4 shows a typical computer for performing the method, since the use of a computer simplifies the method and is the best mode contemplated.

Figure 5:
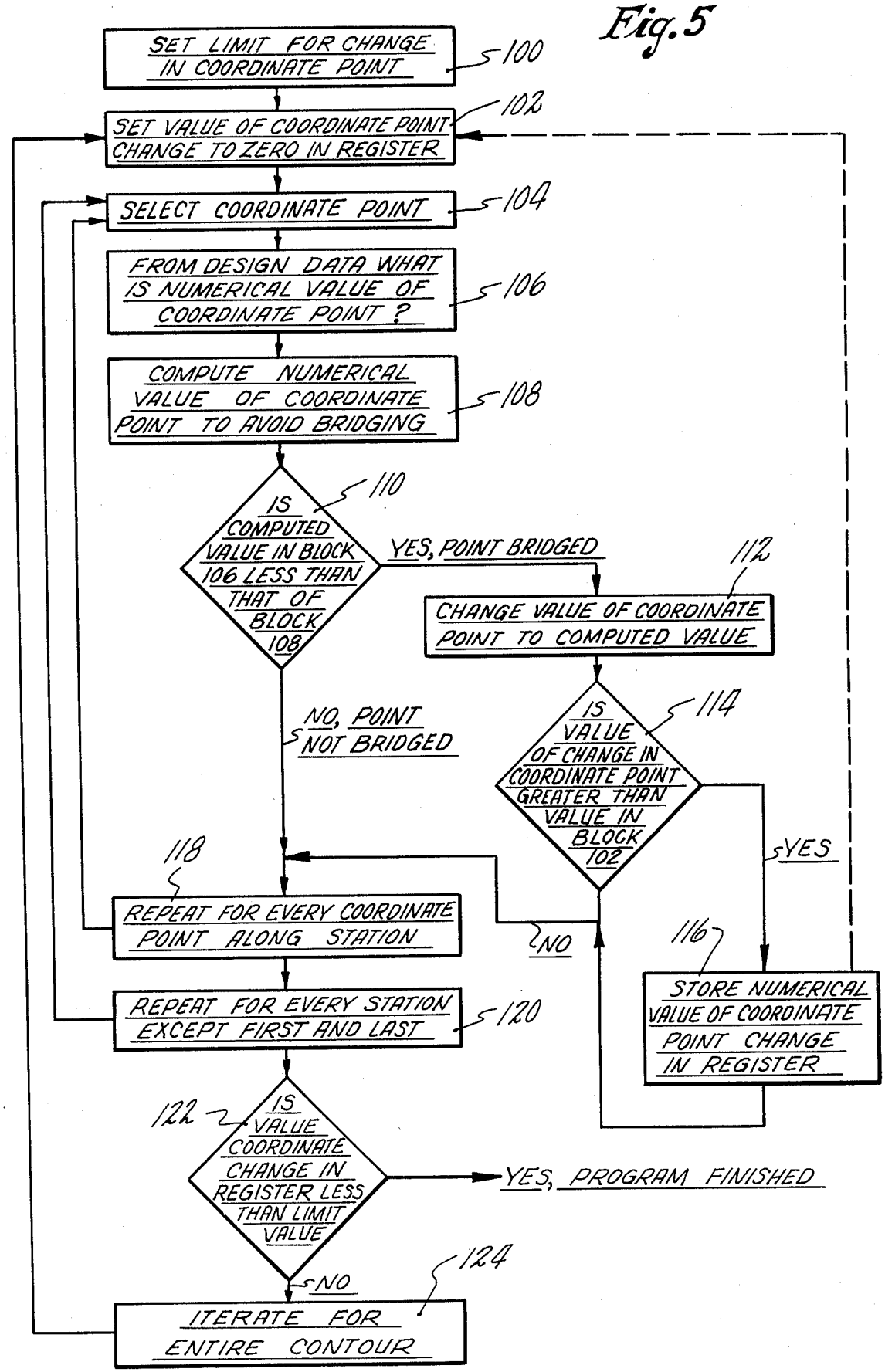
FIG. 5 is a flow chart showing the steps performed in practicing the method of this invention using the computer of FIG. 4.

FIG. 5 shows in flow chart form the instructional format followed in programming the computer to perform the method of this invention. It is apparent that the method of the invention can be implemented in accordance with the steps of the flow chart using any suitable digital computer or preprogrammed analog computer or microprocessor. The actual program steps may be varied depending on the computer and computer language available, and are simple mathematical computations or logical steps, the implementation of which will be apparent to those skilled in the art. In practice the program used is Program F143 of the Hamilton Standard Division of United Technologies Corporation, on an IBM 370/168 computer.

The steps could also be performed on many hand-held commercially available calculators such as HP 65 which preferably perform trigonometric and logarithmic functions for ease of computation. The computer itself forms no part of the present invention, and is shown merely as exemplary of the type of apparatus commercially available on which the invention may be practiced in its best mode.

Referring to FIG. 4 there are shown the basic elements of a digital computer which may be used to practice the invention and include an input unit 50, for example a tape deck or punch card reader, which feeds airfoil design data and program instructions to a memory 52 and a computation and control unit 54. After the program instructions have been executed, output data is fed to output unit 56 such as a printer. The memory 52 and computation and control unit 54 communicate with each other via line 58 as required. The computation and control unit 54 typically contains control logic for the particular program, an instruction register receiving instructions from memory comprising commands and addresses, an arithmetic unit in two-way communication with the memory in which the commands are executed, and an address register feeding data to memory as requested. The input and output units may include peripheral equipment to translate into and from the computer language. Other elements of computers are well known and need not be described in detail.

FIG. 5 shows in flow chart form the program steps performed in the computer of FIG. 4, or in a similar computing apparatus. When automating the method of this invention it is desirable to set a limit on the numerical value of changes in the coordinate point required to avoid bridging, i.e., if a coordinate point is bridged by only a small amount such as 0.02 inches, can the bridging be ignored, or must all coordinate points be carefully free of bridging? In practice it is nearly impossible to construct a mandrel with an accuracy of 0.02 in., so in fact minor bridging can usually be ignored. Thus, block 100 of FIG. 5 contains an instruction whereby a limiting numerical value of the change in a coordinate point to avoid bridging is determined and stored in the computer's memory. It may be that the limiting value is zero, i.e., no bridging is permitted. Another approach, not shown in FIG. 5, is to set a maximum number of iterations of the method, and count each iteration, stopping the program when the maximum number has been reached. Some points may still be bridged, but the majority or at least the largest in magnitude will have been corrected. Likewise it may be desirable to ignore bridging by the first fiber layer if the next layer is not bridged.

After setting the limiting numerical value of changes in the coordinate point, the program proceeds to block 102 where a storage register in the computer memory is set to zero at the beginning of each iteration of the program for the entire mandrel. In this storage register is stored, as the program progresses, the numerical value of the maximum coordinate point change required to avoid bridging during one iteration. Ultimately the value in the storage register will be compared with the limiting value set by the instruction in block 100 to determine if the program is finished, i.e., no bridging has occurred, or the largest bridged coordinate point is less than the limiting value, or another iteration is necessary because the change in a coordinate point to avoid bridging was greater than the limiting value.

The program then selects the first coordinate point, block 104, and determines in block 106 from the design data for the blade stored in the computer memory the numerical value of the coordinate point, i.e., the distance of the selected coordinate point from the winding axis. The next step, block 108, is to compute the numerical value of the coordinate point required to avoid bridging, i.e., compute points A1 or C1, and B2 or B4, and also points A2 or C2, and D2 and D4, as in FIG. 2, interpolating between other coordinate points as necessary, and then as in FIG. 3 compute the distance the coordinate point must be from the winding axis to avoid bridging. The design data for the coordinate point in block 106 is then compared by the instruction in block 110 with the value of the coordinate point to avoid bridging performed in block 108, and if the design value is less than the computed value, bridging will occur and the program branches to block 112. Block 112 instructs the program to change the design value of the coordinate point to the computed value necessary to avoid bridging. The next instruction in block 114 compares the numerical value of the change in the coordinate point to avoid bridging with the value stored in memory by virtue of the instruction in block 102. Since block 102 sets a storage register to zero during each iteration, and since the first coordinate point bridged will cause the numerical value of the change in the coordinate point necessary to avoid bridging to be greater than zero, this value will always be stored. For subsequent bridged coordinate points, the numerical value of coordinate point change may or may not be greater than the value in the storage register. Consequently, if the change in a subsequent coordinate point is greater than that in the storage register, the program branches to block 116 which instructs the program to store the new coordinate point change value. Ultimately for each iteration the storage register will contain a value equal to the largest numerical change in any coordinate point. If the change in the coordinate point is less than the value in the storage register, the instruction in block 116 will be by-passed, and the program will proceed to the instruction in block 118. Likewise if the coordinate point is not bridged, the program will proceed from block 110 to block 118.

The instruction in block 118 requires an iteration of the instructions from block 104, so the program returns to block 104 and selects the next coordinate point along the same station. When all coordinate points along a station have been examined for bridging, the program proceeds to block 120 where it is instructed to repeat the entire process for every station except the first and last. After every coordinate point on the blade, except those on the first and last stations, has been examined for bridging, the program proceeds to the instruction in block 122 where the value of the largest change in any coordinate point during the entire iteration, stored in the register, is compared with the limit set by the instruction in block 100. If the largest change in any coordinate point is less than the limit, the program is ended. However, if the largest change in any coordinate point is greater than the limit, the program proceeds to the instruction in block 124 which requires a return to block 102 and another iteration of the process for the entire blade. As noted previously, a limit may be set for the number of iterations.

While the winding path of the fibers has been described as though it was a plane, this is not the only possible geometric model for the winding path. It is possible to define the winding path by other geometric constructions and therefore, the invention is not limited to the particular coordinate system used, or the particular geometric model used to define the fiber winding path.

While the invention has been described with respect to a rotor blade, it is also applicable to any contoured shape where it is desired to avoid the bridging problem when the contoured shape is wound with any material. It is also apparent that changes and modifications may be made to the invention without departing from its scope as defined by the following claims.

I claim:

1. A method of fabricating a filament wound wind turbine blade comprising the steps of:

defining a surface representative of a winding mandrel;

defining a plurality of stringers along said surface, each of said plurality of stringers being in substantially the same direction as the axis about which said surface is wound;

defining a plurality of stations along said surface, each of said plurality of stations being substantially perpendicular to said plurality of stringers, the intersection of each of said plurality of stringers and stations defining a multiplicity of coordinate points on said surface, said intersections forming a grid of coordinate points; and for each of said coordinate points:

determining the height of said coordinate point from said winding axis;

constructing first and second straight line segments on said surface along said winding path, each said straight line segment connecting said coordinate point respectively with a point on the stringer or station adjacent said coordinate point on opposite sides of said coordinate point;

determining the height of said coordinate point from said winding axis;

constructing a third straight line between said connected points;

determining the presence of a concave portion of said surface by comparing the height of said selected coordinate point from said winding axis with the height of said third straight line from said winding axis, said surface being concave between said connected points along said winding path when the height of said selected coordinate point from said winding axis is less than the height of said third straight line from said winding axis; and correcting any determined concavities by adjusting the height of said selected coordinate point from said winding axis to be substantially equal to or greater than the height of said third straight line from said winding axis;

providing a form having a surface corresponding to said corrected surface; and winding filamentary material about said mandrel surface thereby forming said filament wound blade.

2. A method as in claim 1 including, prior to constructing said mandrel, the steps of:

determining whether the height of any of said plurality of selected coordinate points has been raised;

if the height of any of said plurality of selected coordinate points has been raised, again selecting each of said plurality of coordinate points and determining for each selected coordinate point the presence of a concave portion of said surface;

and changing the height of each said coordinate point for which a concave portion has been determined.

3. A method as in claim 1 in which there exists a plurality of filament winding paths, and including prior to constructing said mandrel, the further steps of:

determining for each selected coordinate point the presence of a concave portion of said surface in each of said plurality of filament winding paths;

and changing the height of each selected coordinate point if there is present in any of said filament winding paths, a concave surface.

4. A method as in claim 1 in which the step of defining a plurality of stringers includes the step of defining a plurality of planes, each thereof including said winding axis, the intersection of said planes with said surface defining said stringers.

5. A method of fabricating a filament wound wind turbine blade comprising the steps of:

defining on a three dimensional contoured surface of a winding mandrel, a plurality of stringers along said surface, each of said plurality of stringers being in substantially the same direction as the axis about which said surface is wound;

defining a plurality of stations along said surface, each of said plurality of stations being substantially perpendicular to said plurality of stringers, the intersection of each of said plurality of stringers and stations defining a multiplicity of coordinate points on said surface, said intersections forming a grid of coordinate points; and for each of said coordinate points:

determining the height of said coordinate point from said winding axis;

constructing first and second straight line segments on said surface along said winding path, each said straight line segment connecting said coordinate point respectively with a point on the stringer or station adjacent said coordinate point on opposite sides of said coordinate point;

determining the height of said coordinate point from said winding axis;

constructing a third straight line between said connected points;

determining the presence of a concave portion of said surface by comparing the height of said selected coordinate point from said winding axis with the height of said third straight line from said winding axis, said surface being concave between said connected points along said winding path when the height of said selected coordinate point from said winding axis is less than the height of said third straight line from said winding axis;

adjusting said mandrel surface to eliminate any concavities therein; and winding filamentary material about said mandrel surface thereby forming said filament wound blade.

6. A method as in claim 5 including the steps of:

determining whether the height of any of said plurality of selected coordinate points has been raised;

if the height of any of said plurality of selected coordinate points has been raised, again selecting each of said plurality of coordinate points and determining for each selected coordinate point the presence of a concave portion of said surface; and changing the height of each said coordinate point for which a concave portion has been determined.

7. A method as in claim 5 in which there exists a plurality of filament winding paths, and including the further steps of:

determining for each selected coordinate point the presence of a concave portion of said surface in each of said plurality of filament winding paths; and changing the height of each selected coordinate point if there is a concave surface present in any of said filament winding paths.

8. A method as in claim 5 in which the step of defining a plurality of stringers includes the step of defining a plurality of planes, each thereof including said winding axis, the intersection of said planes with said surface defining said stringers.

* * * * *

UNITED STATES PATENT AND TRADEMARK OFFICE
CERTIFICATE OF CORRECTION

PATENT NO. : 4,360,871
DATED : November 23, 1982
INVENTOR(S) : David H. Blaney

It is certified that error appears in the above-identified patent and that said Letters Patent is hereby corrected as shown below:

Column 2, line 66, delete "coordinate points".

Column 5, line 37, after "station 4" insert --at point $B_4$--.

Column 5, line 43, "to" should read --adjacent--.

Column 6, line 2, "in" should read --is--.

Column 6, line 17, "$C_2$ and $D_4$" should read --$C_2$ or $D_4$--.

Column 9, lines 49-50, delete "determining the height... said winding axis;".

Signed and Sealed this

Twenty-sixth Day of July 1983.

[SEAL]

Attest:

Attesting Officer

GERALD J. MOSSINGHOFF
Commissioner of Patents and Trademarks